United States Patent
Le Loarer et al.

(10) Patent No.: US 11,981,981 B2
(45) Date of Patent: May 14, 2024

(54) COMPOSITE MATERIAL, HETEROGENEOUS COMPONENT AND MANUFACTURING PROCESS

(71) Applicant: Manufacture d'Horlogerie Audemars Piguet SA, Le Brassus (CH)

(72) Inventors: Thibaut Le Loarer, Chavannaz (FR); Sandra Guadalupe Maldonado, Appless (CH)

(73) Assignee: Manufacture D'Horlogerie Audemars Piguet SA, Le Brassus (CH)

( * ) Notice: Subject to any disclaimer, the term of this patent is extended or adjusted under 35 U.S.C. 154(b) by 207 days.

(21) Appl. No.: 16/994,311

(22) Filed: Aug. 14, 2020

(65) Prior Publication Data
US 2021/0046548 A1  Feb. 18, 2021

(30) Foreign Application Priority Data
Aug. 15, 2019 (CH) .................... 01029/19

(51) Int. Cl.
*A44C 27/00* (2006.01)
*B22D 19/02* (2006.01)
(Continued)

(52) U.S. Cl.
CPC ............ *C22C 21/00* (2013.01); *A44C 27/003* (2013.01); *B22D 19/02* (2013.01); *B22D 25/026* (2013.01);
(Continued)

(58) Field of Classification Search
None
See application file for complete search history.

(56) References Cited

U.S. PATENT DOCUMENTS 4,822,694 A * 4/1989 Randin .................. C04B 41/83
427/244
7,608,127 B2  10/2009 Lin et al.
(Continued)

FOREIGN PATENT DOCUMENTS

CN       108188395 A  *  6/2018
DE       19606689 A1  *  8/1996  ............. B22D 19/14
(Continued)

OTHER PUBLICATIONS

Search Report for CH10292019, dated Dec. 10, 2019, 2 pgs.
European Search Report for EP 20190756, dated Dec. 8, 2020, 4 pgs.

*Primary Examiner* — Xiaobei Wang
(74) *Attorney, Agent, or Firm* — Blank Rome LLP

(57) ABSTRACT

Preform and manufacturing process producing heterogeneous components with a first fraction (11) made from a first metallic material and having a cellular structure with stochastic or regular cells, and a second fraction (12) made from a second metallic material different from the first metallic material, in which the second fraction (12) at least partly infiltrates the cells of the first fraction (11). The second fraction is poured into the preform which also acts as a mould. The finished product after machining may have a unified surface of the second fraction or several zones exposing the second fraction, the first fraction, the cellular structure which is open or infiltrated with the second metallic fraction, or open zones, in a predetermined design.

9 Claims, 4 Drawing Sheets

(51) Int. Cl.
- B22D 25/02 (2006.01)
- B22F 5/10 (2006.01)
- B22F 7/00 (2006.01)
- B22F 7/04 (2006.01)
- B22F 10/00 (2021.01)
- B22F 10/28 (2021.01)
- B33Y 80/00 (2015.01)
- C22C 21/00 (2006.01)
- G04B 37/22 (2006.01)
- B22F 10/12 (2021.01)
- B22F 10/14 (2021.01)
- B22F 10/66 (2021.01)
- B33Y 10/00 (2015.01)
- B33Y 70/00 (2020.01)

(52) U.S. Cl.
CPC ............. *B22F 5/10* (2013.01); *B22F 7/006* (2013.01); *B22F 7/04* (2013.01); *B22F 10/00* (2021.01); *B22F 10/28* (2021.01); *G04B 37/22* (2013.01); *B22F 2007/042* (2013.01); *B22F 10/12* (2021.01); *B22F 10/14* (2021.01); *B22F 10/66* (2021.01); *B22F 2301/052* (2013.01); *B22F 2301/205* (2013.01); *B33Y 10/00* (2014.12); *B33Y 70/00* (2014.12); *B33Y 80/00* (2014.12)

(56) References Cited

U.S. PATENT DOCUMENTS

| | | | |
|---|---|---|---|
| 9,695,090 | B2 | 7/2017 | Hasanovic et al. |
| 2005/0053514 | A1 | 3/2005 | Baur et al. |
| 2015/0230568 | A1 | 8/2015 | Rosenberg |
| 2018/0217560 | A1* | 8/2018 | Furusato ............... G04B 39/002 |

FOREIGN PATENT DOCUMENTS

| | | |
|---|---|---|
| EP | 3093355 A1 | 11/2016 |
| JP | S-62260026 A | 11/1987 |
| WO | WO-2004/047582 A2 | 6/2004 |
| WO | WO-2012/119647 A1 | 9/2012 |

* cited by examiner

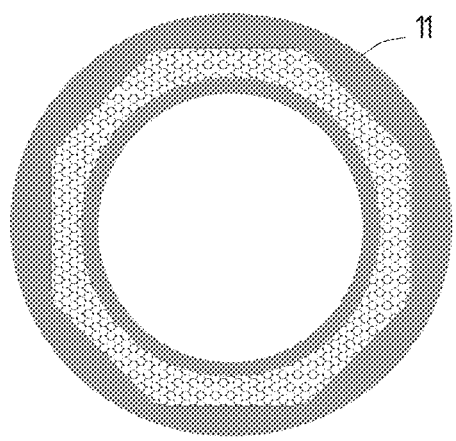
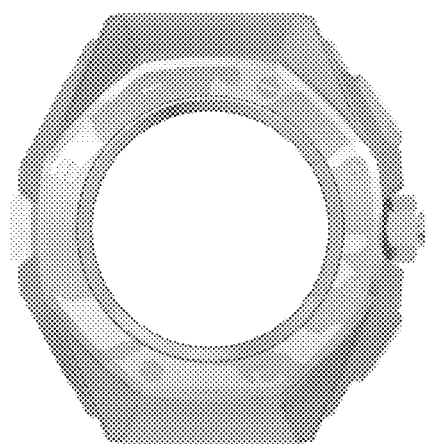
Fig. 5a
Fig. 5e
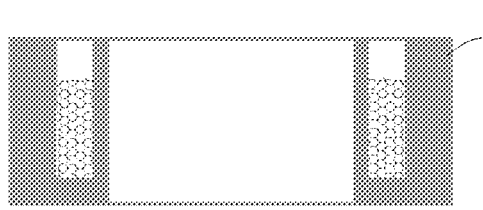
Fig. 5b
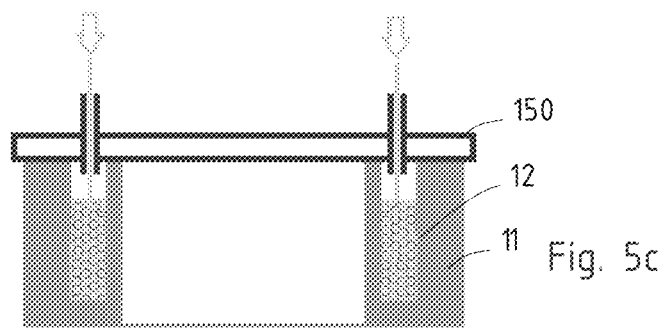
Fig. 5c
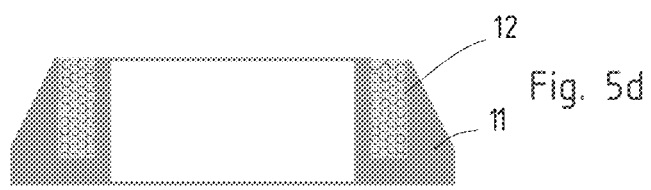
Fig. 5d

COMPOSITE MATERIAL, HETEROGENEOUS COMPONENT AND MANUFACTURING PROCESS

RELATED APPLICATION

This application claims the benefit of Swiss Patent Application No. CH01029/19, tiled on Aug. 15, 2019. The entire content of this application is hereby incorporated by reference.

TECHNICAL FIELD

The present invention relates to a composite material and to a heterogeneous component in such a composite material. The invention also relates to a process for manufacturing such a heterogeneous component.

The invention applies to the field of timepiece-making, and the present description will relate mainly to this field by way of example, but the invention is not thus limited and may also apply to the fields of leather-crafted goods, jewelry, spectacles, the production of writing instruments and many others, and also to the production of functional objects by virtue of the particular features of the proposed composite material.

PRIOR ART

Several precious metals are used in timepiece-making, mainly for trim pieces, but also for functional components. Common precious metals, for example gold and alloys thereof, are heavy and become easily scratched. There is consequently a need for materials which combine a precious nature and attractive appearance with hardness, lightness and other novel desirable properties.

Publications WO 2012/119647 and U.S. Pat. No. 7,608,127 describe composite materials that can be used, inter glia, for the production of watches and jewelry, combining a ceramic material with a precious metal. These materials are harder and lighter than gold alloys. However, their surface is heterogeneous and the colour is different from that of natural gold.

Publication JPS62260026 describes a process for producing a component with a cellular titanium or aluminium core covered with a layer of gold, while U.S. Pat. No. 4,822,694 A discloses a composite material comprising a rigid foam with open pores and a solid material filling the alvaeoli of the foam.

Timepiece trim pieces made of composite material, with a metallic or carbon fibre matrix filled with synthetic resins, are also known. These materials combine lightness and strength, but their hardness is not particularly high, and they do not contain any precious metals.

BRIEF SUMMARY OF THE INVENTION

One aim of the present invention is to propose a composite material for making heterogeneous timepiece components combining a metallic outer appearance with lightness and/or wear resistance.

According to the invention, these aims are notably achieved by means of the subject matter of the attached claims, and notably by a composite material comprising a first fraction made from a first metallic material and having a cellular structure with stochastic or regular cells, and a second fraction made from a second metallic material different from the first metallic material, in which the second fraction at least partly infiltrates the cells of the first fraction.

Another aim of the invention is to propose a process for manufacturing such a heterogeneous component for a timepiece piece, comprising the steps of: providing a first fraction having a cellular structure with a plurality of stochastic or regular cells, made from a first metallic material; joining to the first fraction a second fraction made from a second metallic material different from the first material, the second fraction totally or partly infiltrating the cells.

The dependent claims relate to favourable or advantageous optional implementation characteristics, for example that the second fraction at least partly surrounds the first fraction and has a unified outer surface, or at least some of the cells of the cellular structure are empty, that the second material is an alloy of precious metals, or a precious metallic glass, for example an alloy of gold, silver, palladium or platinum, that the first material has a higher hardness than the hardness of the second material and/or the first material has a lower density than the density of the second material, the fact that the first metallic material is an alloy of aluminium or titanium, or a metallic glass.

As regards the process, with reference to the dependent claims of this category, the invention optionally includes a heating step in which the second material is at least partially brought to the melting point, one or more additive manufacturing operations, for example an operation of selective sintering or selective melting of metal powders, or the placing of the core in a mould followed by a step of injecting the second material in liquid form, and also cutting and finishing steps.

BRIEF DESCRIPTION OF THE FIGURES

Examples of implementation of the invention are indicated in the description illustrated by the attached figures, in which:

FIGS. 5a to 5e schematically illustrate an example of a heterogeneous timepiece component according to the invention and the various steps of the process for obtaining it.

EXAMPLE(S) OF EMBODIMENTS OF THE INVENTION

Definitions

In the context of the present invention, the terms "foam" or "cellular structure" are used to denote materials including an abundance of empty cavities, also known as "cells", "pores" or "bubbles". Preferentially, but not necessarily, the combined volume of the cavities is predominant relative to the volume of solid material. In the metal foams, notably, the solid material is a metal, for example aluminium, titanium, an amorphous metal (metallic glass) or any other metal or metal alloy.

Foams with stochastic cells of variable size and/or shape, obtained, for example, by injection of gas or of a foaming agent into a molten metal, and regular foams with a regular network of cells of the same shape and sizes are distinguished. The latter foams may be manufactured by casting techniques and/or by additive manufacturing.

A foam may be "open" or "closed". It is open if enough cells are in communication with each other, allowing a certain circulation of the gas through the foam (percolation); closed in the contrary case.

Embodiments

Figure 1:
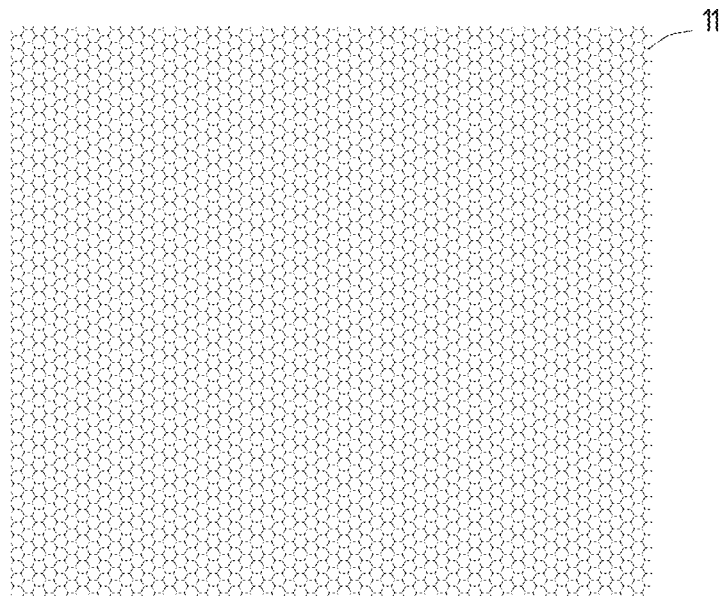
FIG. 1 schematically illustrates a first fraction, or matrix, having a cellular structure, in which the cells are empty (filled with gas)
Figure 2:
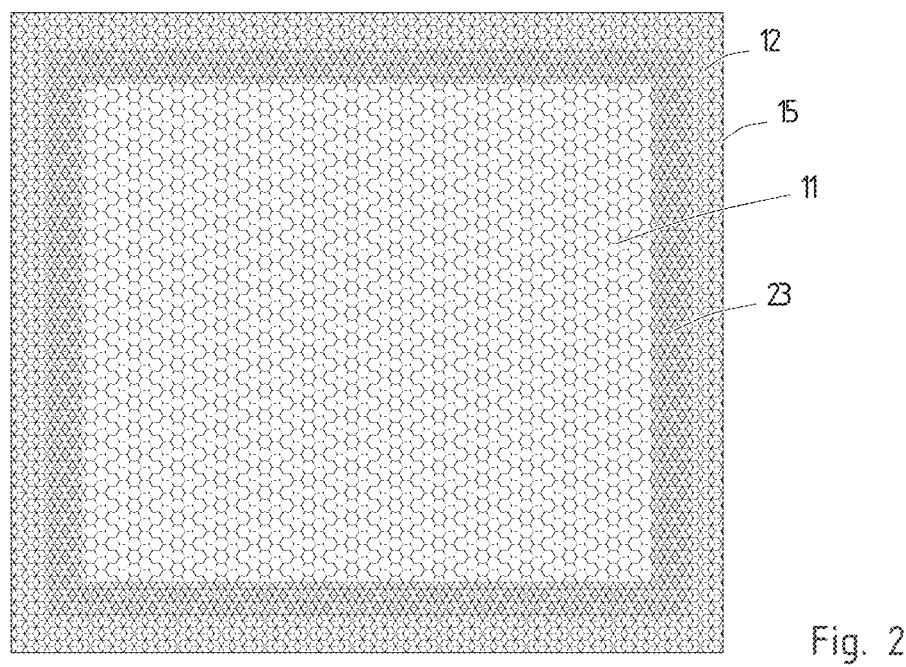
FIG. 2 schematically shows one embodiment of the invention in which the first cellular fraction is surrounded with a metallic second fraction, also known as the skin, formed by the second material, and the second material partly infiltrates the first cellular fraction.

FIGS. 1 and 2 schematically show the structure of a heterogeneous composite material used in the context of the present invention. This composite material includes a first fraction 11 consisting of a metal foam. The first fraction 11 includes an abundance of cavities, represented in the figure by a regular network, but which might also be stochastic, as has been mentioned above.

FIG. 2 shows a second metallic fraction 12 which adds to the first fraction 11, In this example, the composite material includes a second fraction 12 in the form of a skin having a unified and homogeneous visible outer surface 15, such that the piece obtained has the appearance of the metal constituting the second fraction. Favourably, use may be made of a precious material, for example a gold alloy, for the second fraction 12, and of a light metal such as aluminium or titanium for the first fraction 11, so that the composite piece will be considerably lighter than a solid gold piece, while at the same time having the same attractive appearance. As may be seen in FIG. 2, the second metallic fraction 12 at least partially infiltrates—in zone 23—the cellular structure of the first fraction 11. For greater lightness, the infiltration of the second fraction 12 into the matrix 11 may be incomplete and leave an empty zone at the centre.

The adhesion between the cellular matrix 11 and the skin 12 may be solely mechanical, the skin filling the surface porosities of the matrix and giving rise to mechanical anchoring. The skin may have a melting point close to that of the matrix, enabling, in addition to the mechanical anchoring, physical and chemical adhesion.

Figure 3:
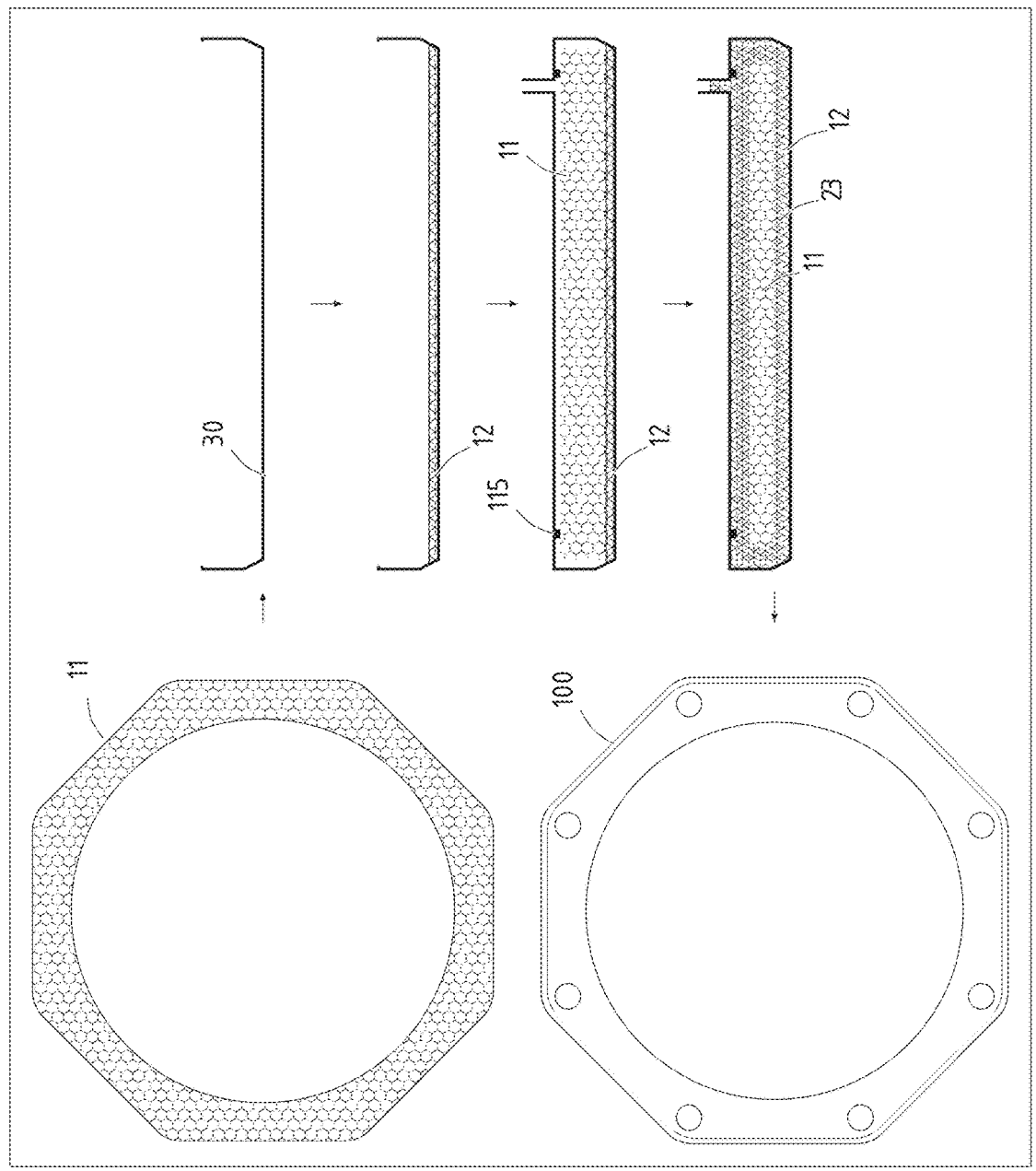
FIG. 3 illustrates a manufacturing process comprising steps of injection into a mould.

FIG. 3 schematically illustrates an example of a heterogeneous timepiece component according to the invention and the various steps of the process for obtaining it. In the example illustrated in FIG. 3, the heterogeneous component is an ultra-light gold watch bezel. The invention is not limited to the production of trim pieces for watches.

A first fraction 11 made of titanium foam is obtained by machining, stamping or any other suitable technique. All its dimensions are smaller than that of the piece that it is desired to obtain. In this example, the core is a bulk piece, but cores assembled from several elements may also be envisaged, in the case of complex shapes.

The mould 30 represents in relief the shape of the object (in this case a watch bezel) that it is desired to obtain, preferably slightly enlarged to allow the usual finishing and terminating operations. The first fraction 11 is inserted into the mould prior to the casting of the gold alloy selected for the second metallic fraction 12, The first fraction 11 is held immobile in the desired position inside the mould 30 by suitable means. In the example represented, the first fraction 11 is gripped between a gold layer 120 and the wedges 115, but many other solutions are possible in the context of the present invention.

The gold alloy is poured into the mould 30, preferably under pressure. After cooling and opening the mould, the bezel 100 is debarred, machined to the final dimensions and polished. It includes, around the cellular core of the first fraction 11, a second fraction 12 in the form of a skin which at least partially infiltrates the pores of the core and has a unified outer surface.

The invention is not limited to conventional casting processes, but also includes all the appropriate special moulding processes, including the injection-moulding of powders and additive manufacturing techniques.

Additive manufacturing and 3D printing techniques notably enable the production of the first fraction, but also the second metallic fraction of the invention, for example on the same printing machine as the matrix, with the use of several materials. 3D printing techniques enable advanced optimization of the internal structure of the first fraction and of the thickness of the second fraction for the forces that the piece is required to withstand, with a considerable gain in lightness over conventionally manufactured trim pieces.

Figure 4:
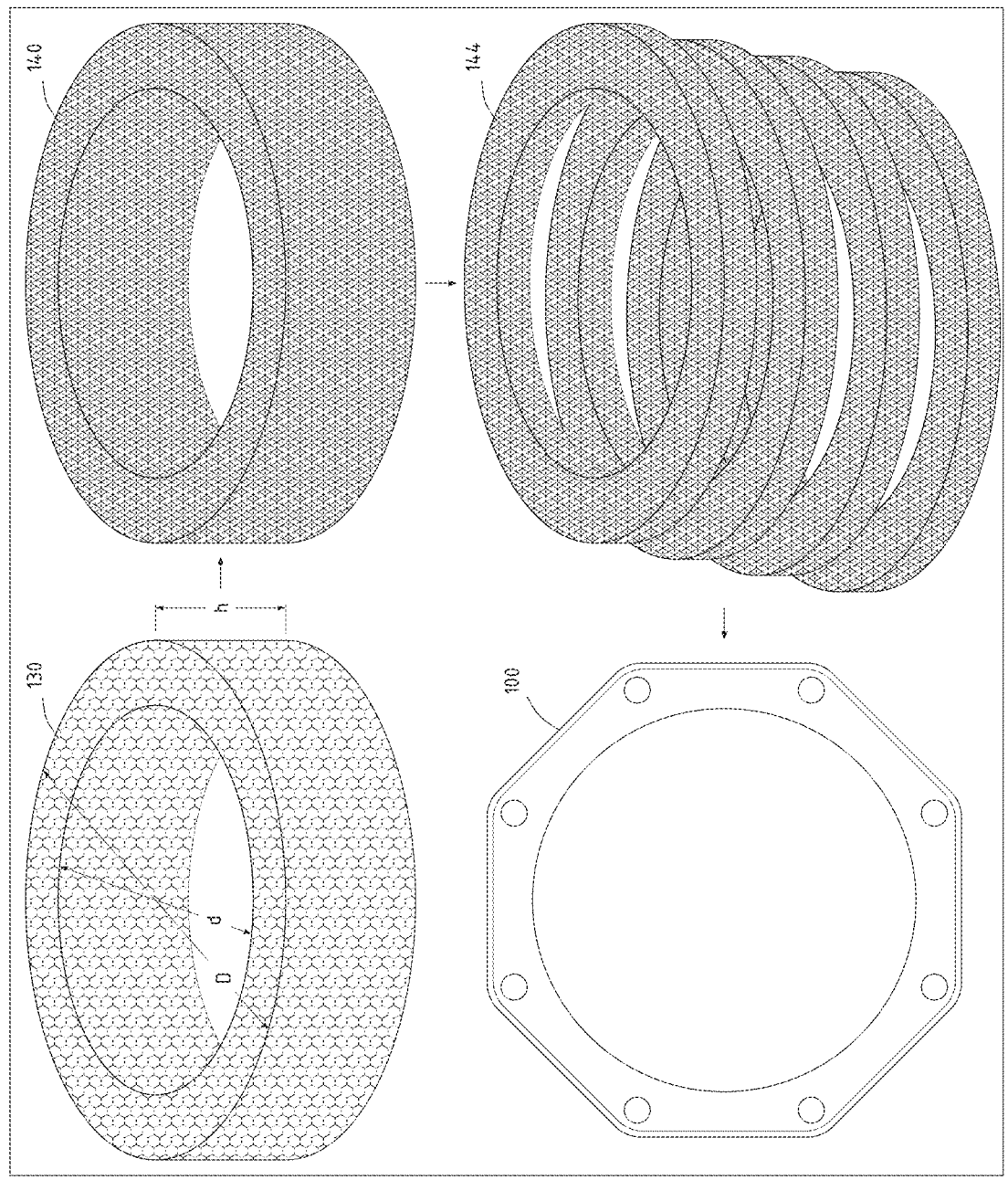
FIG. 4 illustrates an alternative process in which a composite preform is cut and then finished by means of machining and finishing processes.

FIG. 4 schematically represents another embodiment of the invention in which the first metallic fraction 11 is an open-foam titanium preform, the dimensions of which (diameters d and D, height h) are greater than those of the piece that it is desired to obtain. The preform is infiltrated under pressure with a precious alloy, for example 22 carat 5N gold to obtain a preform 140 made of composite material which is then cut to the desired height (pieces 144) and finally machined and finished in the desired shape.

Relative to a conventional gold trim piece, the gold/titanium foam composite bezel is lighter and has better wear resistance and scratch resistance. Advantageously, the titanium foam can be replaced with a foam of another metal having the desired hardness characteristics.

Amorphous metal alloys, or metallic glasses, have very high hardnesses and breaking strengths and may be advantageously used for making the cellular structure of the first fraction of the composite material according to the invention. Alloys of Pd, Cu, Ni, P, notably a metallic glass with atomic proportions Pd43, Cu27, Ni10, P20, are especially recommended for making the cellular structures of the first fractions 11.

Amorphous metal alloys, or metallic glasses, may also contain precious materials such as gold, platinum or palladium. For example, a metallic glass may contain 750/1000 or more by weight of fine gold; these materials may advantageously be used as second fraction which infiltrates the cellular structure of the first fraction.

FIGS. 5a to 5e schematically illustrate an example of a heterogeneous timepiece component according to the invention and the various steps of the process for obtaining it. In this embodiment, the heterogeneous component is a watch bezel made of titanium and pink gold, having a particular and customizable design. The invention is not limited to the production of trim pieces for watches.

FIGS. 5a and 5b present, respectively, a top view and a cross section of a preform 140 which is the first fraction 11. This preform is obtained by 3D printing, for example via a process of SLS (selective laser sintering), SLM (selective laser melting), EBM (electron-beam melting), binder jet printing, or any suitable 3D printing process. Its dimensions are all greater than those of the final piece that it is desired to obtain. The piece includes one or more filled parts, i.e. parts not including any open cells but a filled material, and one or more porous parts with stochastic or regular cells forming an open foam. The shapes and sizes were determined to obtain good anchoring of the second fraction and a particular surface design of the final piece. The filled parts are configured to give rise to partially leaktight cavities with an aperture, to receive and contain a cast molten metal, such that the preform 140 also acts as a mould for the process.

A second fraction 12 in the form of a gold alloy is poured into the preform, preferably under pressure, a lid 150 then closing said preform as illustrated in FIG. 5c. The second fraction 12 will then infiltrate the open cell zones of the first fraction 11.

After cooling and opening the lid, the piece obtained includes zones filled with the first fraction composed solely of titanium without pores, heterogeneous zones including the second fraction infiltrated into the first fraction and optionally, depending on the degree of filling of the second fraction and the geometry of the preform, zones not filled with the first fraction including open cells or zones filled with the second fraction.

The component, in this case a bezel, is then machined to the final dimensions as illustrated in FIG. 5d. It includes, on its inner walls, titanium without any open cells, enabling good leaktightness, and gold constituting the second fraction which infiltrates the titanium open cells.

In one variant, the preform 140 is manufactured such that the porous part, the filled part and the cavity cut a predetermined surface so as to give a predetermined design containing filled regions and porous and/or empty and/or infiltrated regions. During the machining step, the component is cut along the predetermined surface so as to bear at the surface and to make visible the desired design, as illustrated by FIG. 5e.

According to one variant, the outer walls of the cavity of the preform are removed during machining operations so that the finished component has a unified surface of the second metallic fraction.

The invention claimed is:

1. Timepiece component comprising a skeleton foam made of rigid component parts of a first metallic material linked to one another to define an open cellular structure comprising outermost rigid component parts forming an outermost peripheral surface of the skeleton foam, the heterogeneous component further comprising a cast second metallic material filling the open cellular structure, wherein the cast second metallic material further forms a skin having a unified and homogeneous visible outer surface overlaying said outermost rigid component parts of the outermost peripheral surface of the skeleton foam of at least a portion of the open cellular structure.

2. Timepiece component according to claim 1, wherein the first metallic material is made of titanium, of an alloy of titanium, or of a metallic glass.

3. Timepiece component according to claim 1, manufactured via an SLS or SLM 3D printing process.

4. Timepiece component according to claim 1, the open cellular structure including at least one of regular alveoli and stochastic alvaeoli.

5. Timepiece component obtained by a manufacturing process, comprising the steps of:
   providing a skeleton foam made of rigid component parts of a first metallic material linked to one another to define an open cellular structure comprising outermost rigid component parts forming an outermost peripheral surface of the skeleton foam;
   pouring into the open cellular structure a second metallic material different from the first metallic material, the second metallic material at least partly infiltrating the open cellular structure and forming a skin having a unified and homogeneous appearance;
   after solidification of the second metallic material, performing at least one machining operation to obtain a heterogenous component having final dimensions and said skin being a visible outer surface of said component overlaying outermost rigid component parts of the outermost skeleton foam of at least a portion of the open cellular structure.

6. Timepiece component according to claim 5, in which the second metallic material is an alloy comprising precious metals.

7. Timepiece component according to claim 5, in which the second metallic material is a metallic glass containing a precious material, or a metallic glass containing a fraction of gold of greater than or equal to 750/1000 by weight.

8. Timepiece component according to claim 5, in which the open cellular structure of the first metallic material is configured to create a predetermined design including filled zones and porous zones and/or open zones in a section on a predetermined surface and the machining includes the cutting of the preform along the predetermined surface to bear at most a portion of the surface and to make visible the design.

9. Timepiece component according to claim 5, in which the machining leaves a unified surface of the second metallic material.

* * * * *